United States Patent
Geppert et al.

(10) Patent No.: US 12,270,538 B2
(45) Date of Patent: Apr. 8, 2025

(54) MODULAR SYSTEM FOR INDIRECT ILLUMINATION

(71) Applicant: Methode Electronics Malta Ltd., Birkirkara (MT)

(72) Inventors: Michael Geppert, Bingen (DE); Elie Assy, Mainz (DE); Thomas Abel, Lüdenscheid (DE)

(73) Assignee: Methode Electronics Malta Ltd., Birkirkara (MT)

( * ) Notice: Subject to any disclaimer, the term of this patent is extended or adjusted under 35 U.S.C. 154(b) by 0 days.

(21) Appl. No.: 18/242,114

(22) Filed: Sep. 5, 2023

(65) Prior Publication Data

US 2024/0077186 A1    Mar. 7, 2024

(30) Foreign Application Priority Data

Sep. 6, 2022 (DE) .................... 102022122513.5

(51) Int. Cl.
| | |
|---|---|
| F21V 5/08 | (2006.01) |
| F21V 5/00 | (2018.01) |
| F21V 5/04 | (2006.01) |
| F21V 11/06 | (2006.01) |
| F21V 11/14 | (2006.01) |
| F21V 17/00 | (2006.01) |
| G02B 5/00 | (2006.01) |
| F21Y 115/10 | (2016.01) |

(52) U.S. Cl.
CPC ............... *F21V 5/08* (2013.01); *F21V 5/008* (2013.01); *F21V 5/045* (2013.01); *F21V 11/06* (2013.01); *F21V 11/14* (2013.01); *F21V 17/002* (2013.01); *G02B 5/003* (2013.01); *F21Y 2115/10* (2016.08)

(58) Field of Classification Search
CPC . F21V 5/08; F21V 5/045; F21V 11/06; F21V 11/14; F21V 17/002; G02B 5/003
See application file for complete search history.

(56) References Cited

U.S. PATENT DOCUMENTS

| | | | |
|---|---|---|---|
| 10,677,415 B1* | 6/2020 | Zhao | F21V 17/002 |
| 2014/0092596 A1* | 4/2014 | Deutsch | F21V 5/08 |
| | | | 362/235 |
| 2014/0252249 A1* | 9/2014 | Doros | F21V 14/06 |
| | | | 362/311.1 |
| 2014/0327263 A1* | 11/2014 | Van Arnam | B60Q 1/2611 |
| | | | 362/520 |
| 2018/0128442 A1* | 5/2018 | Suwa | B60Q 1/1423 |
| 2019/0107660 A1* | 4/2019 | Franck | F21V 11/06 |
| 2020/0149706 A1* | 5/2020 | Khosla | F21V 5/007 |
| 2021/0033754 A1* | 2/2021 | Steg | B64G 1/54 |
| 2022/0120412 A1* | 4/2022 | Bremerich | F21V 7/09 |
| 2022/0326416 A1* | 10/2022 | Namba | G02B 7/021 |

FOREIGN PATENT DOCUMENTS

DE    102017128896 A1    6/2019

* cited by examiner

*Primary Examiner* — Christopher E Dunay
(74) *Attorney, Agent, or Firm* — Greenberg Traurig, LLP

(57) ABSTRACT

A system for illuminating a surface has at least one lighting means and a housing. At least one lens is disposed within the housing. The at least one lens is supplied with light rays from the lighting means. The at least one lens for illuminating the surface is exchangeable.

15 Claims, 1 Drawing Sheet

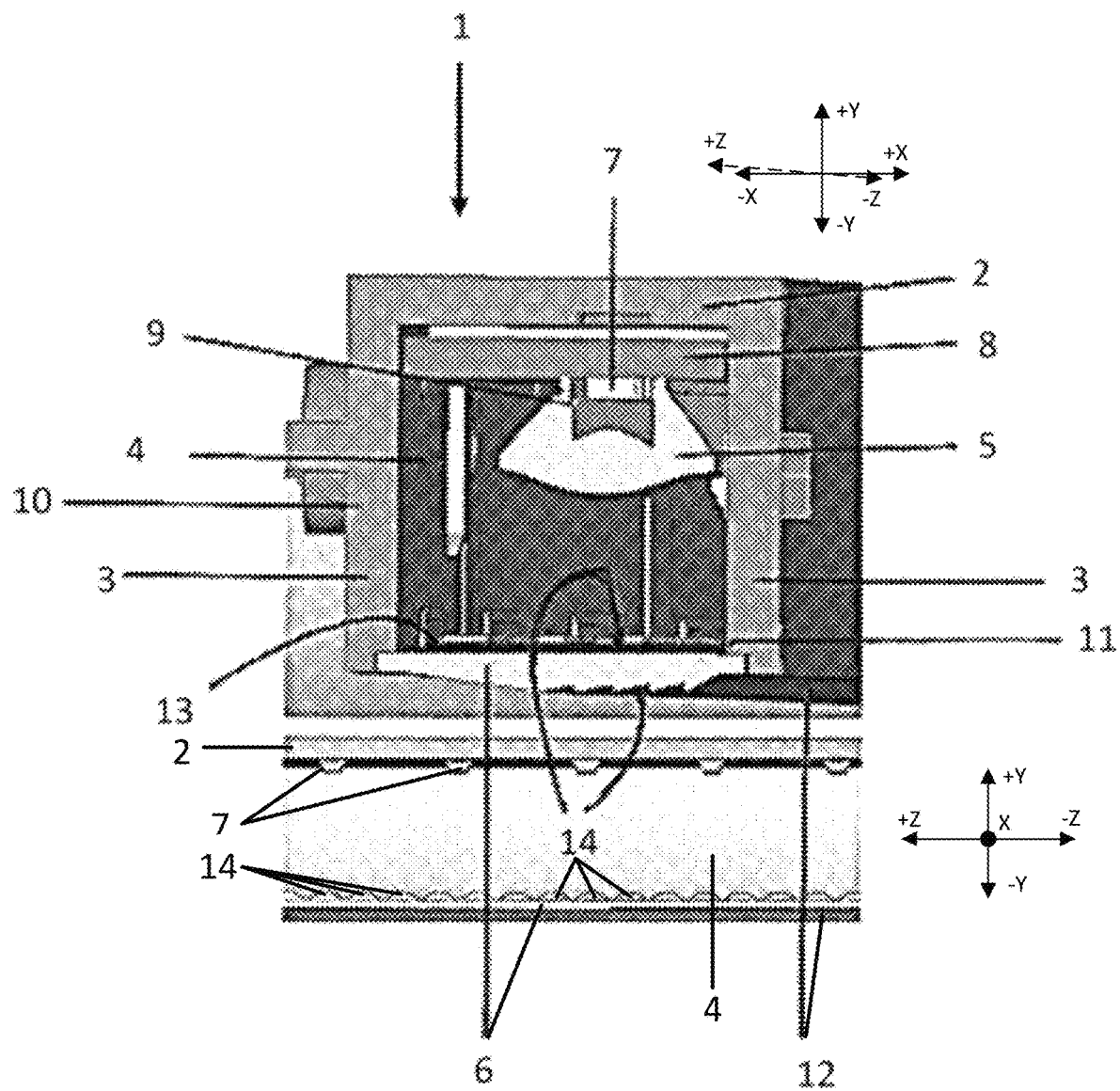

MODULAR SYSTEM FOR INDIRECT ILLUMINATION

RELATED APPLICATION DATA

This application claims priority benefit to German patent application serial no. DE 10 2022 122 513.5, filed on Sep. 6, 2022, currently pending, the disclosure of which is incorporated by reference herein.

DESCRIPTION

The disclosure relates to a system for illuminating a surface. The system has at least one lighting means and a housing having at least one lens disposed therein. The lens is supplied with light rays from the lighting means. The at least one lens is interchangeable with another lens of a plurality of lenses.

BACKGROUND

DE 10 2017 128 896 A1 discloses an assembly for illuminating the interior of a motor vehicle. The assembly comprises at least one light source disposed within the interior of the motor vehicle for emitting light and for illuminating the interior. A light-emitting, planar or elongate element is disposed. The element forms at least a part of the light source which may be used to illuminate the interior. The element emits light across its surface or its length. The light source may be an indirect light source. The assembly may also be used as an exterior lighting.

OBJECTS OF THE INVENTION

Known systems for illuminating interiors and/or exteriors of motor vehicles often prove to be disadvantageous, since the systems may not be adapted to create different geometric light effects in a standardised construction of the system.

The systems supplied by the system manufacturer are not to be in-stalled such that the standardised systems may be adapted to create the geometric light effects desired in each case.

The adaptation of the system for creating the geometric light effects desired in each case should be able to be performed at low cost and with little time expenditure.

The object is to provide a system which overcomes the disadvantages of known systems according to the state of the art and which may be adapted more flexibly to individual customer requirements.
Achieving the Objects The object is achieved by a system for illuminating a surface having at least one lighting means and a housing.

At least one lens is disposed within the housing. Hereinafter, by way of example, but not exclusively, it is assumed that there are two lenses. The lenses are supplied with light rays of the lighting means.

At least one lens is interchangeable or replaceable or exchangeable for another lens of a plurality of lenses. Hereinafter, the term interchangeable also comprises the terms replaceable and exchangeable.

Since the lens is interchangeable for another lens of a plurality of lenses, the system is referred to as being modular.
Lighting Means The invention provides at least one lighting means which may be used to illuminate a surface, preferably an inside of a vehicle, in particular of a motor vehicle.

The invention provides for the system for illuminating a surface and/or the lighting means associated thereto to be also used for illuminating the exterior of the vehicle. Hereinafter, by way of example, but not exclusively, illumination of a surface is assumed to be visible from inside of the vehicle.

It should be understood that the term motor vehicle comprises a motorised vehicle on water, on land or in the air.

However, hereinafter, by way of example, but not exclusively, it is assumed to be a motor vehicle.

The lighting means is disposed within a housing, which will be discussed in detail below.

The lighting means is provided for creating an optical light effect. The optical light effect will be discussed in detail below.

The lighting means is preferably, but not exclusively, at least one of what is referred to as an LED. Instead of an LED, another lighting means may also be used.

Hereinafter, by way of example, it is further assumed that the lighting means is an LED.

Herein, the term LED means an electric light source which uses at least one light-emitting diode (LED) to generate the light. Hereinafter, the term LED is used for simplification.

The LED preferably is a semiconductor component which emits light when electric current flows in a conducting direction.

It should be understood that a single or multiple LED(s) may be disposed.

Red and/or green and/or blue light-emitting diodes may be disposed. The red, green, or blue LED is also referred to as an RGB LED. The light emitted by the respective RGB LED in red, green, or blue colour may be combined with one another within a housing. In this way, the differently coloured light mixes to create a further hue. Control-ling the respective RGB LEDs may result in the generated light appearing as being white light from the outside.

It should be understood that other LEDs may also be used to achieve a colour mixture. By way of example, but not exclusively, what is referred to as CMYK LEDs with four light-emitting diodes may be employed. The respective LED may have different hues. Preferably, but not exclusively, the LED may have a CYAN hue or a magenta hue or a yellow hue or a black hue. By way of example, but not exclusively, the RGB LED may be employed for digital work, while the CMYK LED may particularly be used for printed products.

In addition, single-colour LEDs may also be used without the need for a colour mixture.

The LEDs may be disposed in at least one horizontal row. The LEDs may also be positioned in at least one vertical column. The LEDs may also be disposed offset relative to one another.

Preferably, but not exclusively, the LEDs may be positioned linearly, circularly, elliptically or radially relative to one another.

The LEDs may be positioned equally spaced or differently spaced from one another.

It should be understood that the LEDs may also be positioned in another geometric shape, symmetrically or asymmetrically relative to one another.

The LEDs may be distributed equally spaced or unequally spaced from one another. The surface may assume any possible geometric shape.

It should be understood that equally sized LEDs may be employed. However, the LEDs may also have different sizes.

The LEDs may differ from one another in intensity of the light emitted. The intensity of the light emitted may also be the same for all LEDs.

The LEDs may generate light simultaneously. The LEDs may be switched on and/or off in a predetermined time sequence.

The LEDs may differ in their performance data. The performance data of the LED are preferably, but not exclusively, design of the LED, light output, luminance and current density, radiation angle of the LED, light current, or light spectrum. Of course, other performance data of an LED may also be present.

The LED may have different designs. By way of example, but not exclusively, the LED may be a wired radial LED. The wired LED may have at least one solder disposed on the back side of a board. In addition, further connecting wires (referred to as pins) and/or a flattened housing may be provided at the negative pole.

Alternatively, one of what is referred to as SMD (surface mounted devices) LED may be provided. The SMD LED does not have any wire connections. The SMD LED may rather be glued directly to a surface of the circuit board.

By way of example, but not exclusively, one of what is referred to as SuperFlux LED may also be used. Preferably, but not exclusively, the SuperFlux LED comprises a plurality of pins and an equal number of semiconductor crystals. Several contact feet of a SuperFlux LED may be controlled separately.

The LED may also be designed as what is referred to as HighPower LED. The chip of the HighPower LED may be glued directly onto a heat-conducting plate without any additional encapsulation.

It should be understood that other LED designs may also be used.

The individual LEDs may differ in their light output. The light output of the LED expresses how much lumen (lm) per watt (W) is generated by the respective LED. By way of example, but not exclusively, the LED may achieve a light output of up to 134 lm/W. It should be understood that other values for the light output of the LED may also be achieved.

The luminance and current density of the LED describes in particular how closely compressed an electric current flows within the LED. Thus, the luminance and current density of the LED is a measure of the load on a current conductor of the LED.

The radiation angle of the LED indicates the angle at which the light of the LED is emitted forward. The greater the radiation angle of the LED, the greater is the illuminated area of the LED.

The luminous flux of the LED describes the luminous power radiated by the LED in all directions in the visible range.

The light spectrum of the LED is the part of the electromagnetic spectrum of the LED which may be perceived by the human eye without using technical aids.

Lens

In optics, the lens is a transparent disk. The lens has at least two surfaces. The light generated by the LED enters the lens in the housing at a surface of the lens. The light passes through the lens and exits the lens at another surface.

At least one of the surfaces of the lens may be curved spheroidally or spherically. Hereinafter, by way of example, the lens is assumed to be curved.

The curvature of the lens may be concave or convex relative to a centre of the lens. It should be understood that two opposing surfaces of the lens may be concave. However, the surfaces may also be convex relative to one another. Of course, one of the two surfaces of the lens may be concave and the other surface of the lens may be convex.

Light rays are combined at the convex surface of the lens. In contrast, the concave surface of the lens disperses the rays of the entering light.

The surface of the lens may have at least one geometric structure. The geometric structure will be discussed in detail below.

At least two lenses are disposed within the housing. However, more than two lenses may also be provided.

The lenses each are anchored within the housing. The lenses are removeable from the anchorage.

Upon removing the lens, the removed lens may be replaced or interchanged for another lens. The other lens is a lens of a plurality of lenses which is available for replacing or interchanging or exchanging the removed lens for another lens.

The lenses provided for interchanging or replacing may be commercially available lenses. It may also be a newly developed lens or a newly manufactured lens.

The modular system comprises at least one quick-release fastener for interchanging or replacing or exchanging the respective lens. In this way, the respective lens may be interchanged quickly and at low cost. By means of the quick-release fastener, in order to exchange the lens, the lens may be easily and quickly released from the receiving component, preferably from the housing. By means of the quick-release fastener, another lens may be easily and quickly re-inserted into the receiving housing.

The lenses may be positioned parallel to one another within the housing. Alternatively, the lenses may also be disposed at an angle to one another within the housing.

Hereinafter, by way of example, but by no means exclusively, the invention assumes a parallel arrangement of the lenses. Solely by way of example, one lens is referred to as an inner lens and the second lens is referred to as an outer lens.

The invention assumes that the inner lens is disposed in the area of a base of the housing. However, it may also be positioned in the area of an inner wall of the housing. The inner lens may alternatively be disposed in the area of the LED.

The base is discussed in detail below in relation to the housing.

The housing will be discussed in detail below.

The light emitted by the lighting means impinges on the respective lens. The light then passes through the lens.

It is assumed that the light has a plurality of individual light rays. The respective lens may deflect the light in a predetermined direction. The lens may disperse individual light rays. Alternatively, the lens may bundle individual light rays.

In addition, at least one optical device may be disposed between the inner lens and the outer lens.

The optical device will be discussed in detail below.

The invention assumes it to be preferably, but not exclusively, a light-collecting lens or a diverging lens or a light orientation or light pattern lens. However, this does not exclude the potential employment of other types of lenses.

The light-collecting lens combines several light rays impinging parallel to the optical main axis on the collecting lens behind the lens in what is referred to as a focal point.

The dispersing lens has a negative refractive power. Light rays incident in parallel into the lens are dispersed from one another behind the lens, such that the optical effect of the dispersing lens does not serve for bundling but for dispersing the light rays.

A light orientation or light pattern lens of an LED creates a particular light pattern that is visible when the LED is activated. The view provided by the LED is what is referred to as light pattern.

Solely by way of example, but not exclusively, the inner lens may be a light collecting lens or a dispersing lens. The outer lens may be a light orientation or a light pattern lens. It should be understood that the arrangement may also be reversed.

It should also be understood that, instead of the lens, at least one other optical element may also be employed for shielding and/or diffraction of light.

Geometric Structure of the Lens

The surface of the inner lens and/or the surface of the outer lens comprises at least one geometric structure.

The geometric structure may be facing the centre of the respective lens. The geometric structure may alternatively be facing away from the centre of the respective lens.

The geometric structure may have a rectangular shape. The structure may also have the shape of a cylinder or the geometric shape of a prism.

In this context, a prism is a geometric body having a polygon as its base. The side edges of the prism extend parallel to one another and are of equal length.

The term prism in optics means a transparent body for manipulating light rays. The light rays are manipulated in the prism by refraction and/or by dispersion and/or by reflection.

The geometric structure may be curved. It may have a rounded shape or be elliptical. The geometric structure may also comprise a jagged pattern.

The geometric structure may be symmetrical or asymmetrical.

It should be understood that the geometric structure may also assume any other geometric shape.

Housing

The modular system for indirect illumination of a surface comprises a housing. The housing preferably is a solid shell.

The housing protects components of the system disposed within the housing from external influences such as debris and/or moisture. The housing also prevents undesired intrusion of light into the interior of the housing. In addition, the housing prevents light from exiting the housing to the outside at undesired locations.

The housing comprises at least one base. At least one side wall of the housing is positioned on the base.

It should be understood that the housing and the base may be a common component.

The side wall of the housing may be circumferential. The side wall may also be composed of individual sections.

The side wall encloses the interior of the housing. On one side, the side panel sits on the base and closes the interior of the housing. The opening of the housing is disposed on the outside of the side wall opposite the base.

The surfaces of the base and/or the surfaces of the at least one side wall of the housing facing the interior of the housing are provided with a layer.

The layer may be a black, light-absorbing layer. The layer may alternatively comprise high-gloss metal. It should be understood that the layer may also be of a different colour and/or may comprise other materials.

The layer may be a foil. It may also be a layer of paint. The layer may also be a laminate of several colour layers or of several foils.

It should be understood that the outer surfaces of the base and/or the side wall of the housing each facing away from the interior of the housing may also be provided with a corresponding layer.

The interior of the housing is accessible through the opening of the housing.

The components of the modular system for indirect illumination comprise at least one circuit board and/or at least one lens.

At least one lighting means is disposed within the housing as a further component.

Additional components positioned within the housing may be at least a grating and/or a reflector for blocking and/or conducting light.

On the outside of the housing, means for securing the housing to a support may be provided on the base and/or on the side wall of the housing.

In addition, it is assumed that the support secures the housing of the modular system for dynamic, indirect illumination to a door of a motor vehicle.

Of course, the support may also secure the housing to another component of the motor vehicle.

The support positions the housing in an area of an illuminable surface of the vehicle door. The illuminable surface of the vehicle door is preferably disposed on the exterior of the vehicle door of a motor vehicle. The exterior of the vehicle door may be facing the interior of the vehicle. The exterior of the vehicle door may also be facing away from the interior of the vehicle.

The exterior of the vehicle door will be discussed in detail below.

The housing of the system, the base and/or the at least one side wall of the housing may be made of plastic or of another material.

Optical Devices

Reflector

In an alternative embodiment, an optical device in the form of a reflector may be disposed within the interior of the housing. The reflector is provided for conducting and/or directing individual light rays.

The reflector may be a reflective body. The reflector may also be a reflective surface of a body, preferably of a lens or another body.

The inner and/or the outer lens and/or a further lens may comprise a reflector. The reflector may be part of the respective lens.

Independently of the lens, at least one separate reflector may be provided.

The reflector may reflect the light. The reflector may reflect individual light rays or the light beam in at least one direction.

The reflector may reflect the light at at least one desired angle.

The reflector may direct and/or align the light between the two lenses.

The reflector may be designed as a mirror. The mirror preferably, but not exclusively, reflects all the light incident on the mirror.

Depending on the shape and structure of the reflector, the invention distinguishes between a planar reflector and a curved reflector. Depending on the shape and structure of the reflector, a smooth or a rough reflector may be present.

Grating

An optical device in the form of a grating may be disposed within the interior of the housing.

The grating is a grid-shaped arrangement of elongated parts evenly spaced apart. Hereinafter, the term grating is used in general.

The grating may be positioned in the area of the housing between the inner lens and the outer lens.

The grating may be disposed on the side of the outer lens facing away from the base.

The grating may be fitted into the opening of the housing.

The grating may at least partially close the opening of the housing and/or the interior of the housing.

The grating may have a circumferential bezel.

The grating at least partially blocks the light in the interior of the housing. In addition, the grating prevents the light from leaking out of the housing.

The grating may cause a shielding of light. However, the grating may also cause a light reduction.

The grating directs the light in the housing in a desired manner relative to the outer lens.

The grating may be made of metal or plastic or another material.

Diaphragm

An optical device in the form of a diaphragm may be disposed within the housing.

On the exterior of the outer lens facing away from the base of the housing, a diaphragm may be disposed in the opening of the housing.

The term diaphragm herein means an optical device which limits the cross section of a beam of rays.

The diaphragm affects the brightness of the image generated on an illuminated surface.

The illuminated surface will be discussed in detail below.

Using the diaphragm may cause, at least in some areas, a darkening of the illuminated surface in the edge area of the surface.

The diaphragm may cause a shading of the illuminated surface towards the surface edge. A drop in the peripheral light of the illuminated surface may be achieved at the same time.

In addition, a distortion of the generated light may be achieved at the corners of an illuminated surface. The distortion may be referred to as an optical distortion of the light.

The diaphragm may have a perforated pattern. The perforated pattern may be designed using black and/or light-absorbing colour. The perforated pattern may comprise a layer of high-gloss metal. The respective design or coating of the perforated pattern has an individual effect on the design of the optical light effect.

The diaphragm may be a body which has a black and/or a light-absorbing layer. The layer of the diaphragm may also comprise a high-gloss metal.

Circuit Board

At least one circuit board is disposed within the housing.

The circuit board may be designed as a circuit card, as a board or printed circuit or as a PCB (printed circuit board).

In the following, the term circuit board is used in general. The circuit board is a support for electronic components.

The circuit board is for mechanically securing and/or electrically connecting the electronic components of the modular system for indirect illumination.

The circuit board supports the at least one LED.

The circuit board may comprise an electrically insulating material.

In addition or as an alternative to the at least one LED, at least one electronic controller (electric control unit) may be disposed on the circuit board.

The electronic controller may be positioned separately from the circuit board. It may also be spaced apart from the circuit board.

The circuit board may be a rigid circuit board. However, it may also be manufactured as a flexible circuit board.

Software

The modular system for indirect illumination comprises commonly known software. The software preferably, but not exclusively, controls at least two components of the modular system for indirect illumination.

Illuminated Surface

Illuminated surface herein means the exterior of a three-dimensional body, preferably of a vehicle. The illuminated surface also means an illuminable surface. In the following, it is generally referred to as an illuminated surface.

The illuminated surface is preferably the exterior of a vehicle door.

The term exterior, using the example of the vehicle door, herein means the surface of the vehicle door that is perceptible to the human eye. The exterior of the vehicle door may be facing away from the interior of the vehicle and be facing the surroundings of the vehicle. However, the exterior of the vehicle door may also be facing the interior of the vehicle and be facing away from the surroundings of the vehicle.

The exterior of the vehicle door may be facing the interior of the vehicle. The exterior of the vehicle door may also be facing away from the interior of the vehicle.

Preferably, but not exclusively, the term exterior may also be used to refer to the exterior of the headliner of the motor vehicle. However, it may also refer to the exterior of a seat surface in the motor vehicle.

The illuminated surface may also be the exterior of any other component of the motor vehicle.

The exterior of the other component of the motor vehicle may be facing the interior of the motor vehicle. The exterior of the other component of the motor vehicle may also be facing away from the interior of the motor vehicle.

The illuminated surface of the exterior of the vehicle door facing the interior of the motor vehicle may have a length of 660 mm and a height of 110 mm.

It should be understood that other dimensions may also be considered.

Optical Light Effect

The modular system for indirect illumination creates an optical light effect on the illuminated surface of the exterior of the vehicle.

The optical light effect is the light that is visible when the at least one LED of the system for indirect illumination is activated.

The optical light effect may comprise alternating light effects. The term alternating light effects herein means optical effects where the light effects are continuously changing. The transitions between one of the individual light to another each are smooth. It should be understood that alternatively, instead of the alternating light effects, static light effects may also be comprised.

The modular system for indirect illumination comprises indirect light which is preferably reflected onto the exterior of a vehicle door.

The indirect illumination is preferably used to illuminate a larger area.

The modular system for indirect illumination comprises dynamic illumination. Dynamic illumination allows the colour and/or the brightness and/or the colour temperature to be controlled independently of one another.

The illumination is referred to as dynamic when the light changes during operation with respect to one or more parameters. Preferably, but not exclusively, a parameter may be the illuminance and/or the light colour and/or the light direction.

It should be understood that other parameters may also be applied.

In particular, LED lighting means are employed to generate the dynamic light. By means of the LED technology, a particularly natural light may be generated.

Using a multi-row arrangement of the LEDs, light movements may be caused in a longitudinal direction of the vehicle or transversely to the longitudinal direction of the vehicle.

Preferably, but not exclusively, the light movements may be generated in different patterns or in the same patterns. The light movements may be designed to be the same or different in intensity or the same or different in homogeneity.

The modular system for indirect illumination allows for the brightness and/or the colour of the light to change continuously.

Of course, in the context of the modular system for indirect illumination, the LED may also create other optical light effects.

DESCRIPTION OF THE DRAWINGS

FIG. 1 shows a housing with a base and a side wall.

DETAILED DESCRIPTION

FIG. 1 shows a housing 1 with a base 2 and a side wall 3.

An inner lens 5 and an outer lens 6 are shown in the interior 4 of the housing 1.

An LED 7 is connected to the base 2 of the housing 1 via a circuit board 8.

In FIG. 1, the inner lens 5 is shown connected to the base 2 of the housing 1 via the circuit board 8 such that the inner lens 5 is interchangeable for another inner lens (not shown).

The LED 7 projects beyond a socket 9 into the inner lens 5. Both in the area of the socket 9 and at the end of the inner lens 5 opposite the socket 9 in FIG. 1, the inner lens 5 has contours for collecting light.

In the area of the outer lens 6 facing the interior 4 of the housing 1, the outer lens 6 has contours for creating light patterns. In addition, contours for light orientation may be disposed on the outer lens 6.

The side wall 3 of the housing 1 has a means 10 securing the housing 1 to a support (not shown).

On the side of the outer lens 6 facing the inner lens 5, a grating 13 is positioned in an opening 11 of the housing 1.

FIG. 1 shows the outer lens 6 positioned in the opening 11 of the housing 1 such that the outer lens 6 is removeable from the opening 11 of the housing 1 in order to be interchanged for another outer lens (not shown).

A diaphragm 12 is positioned in the opening 11 of the housing 1 on the side of the outer lens 6 facing away from the inner lens 5. The diaphragm is arranged within the housing and has a perforated pattern.

The outer lens 6 has structures 14 on the side facing the inner lens as well as on the side facing away from the inner lens 5.

The mod-ular system comprises at least one quick-release fastener for inter-changing, replacing or exchanging the at least one lens.

When the at least one lens is at least one of interchanged, replaced or exchanged, least two optical light effects different from one another are achieved. The at least two optical light effects are a dynamic or static illumination of the surface. One of the at least two optical light effects is an indirect illumination of the surface.

The inner lens positioned in the area of a base of the housing. The in-ner lens has at least one geometric structure.

The outer lens positioned in the area of an opening of the housing. The outer lens has at least one geometric structure. The outer lens has one of a black, light-absorbing layer and a layer of high-gloss metal on a side facing the base.

At least one of a surface of the base, a surface of at least one side wall of the housing, each facing an interior of the housing, is provided with one of a black, light-absorbing layer and a layer of high-gloss metal.

The housing comprises at least one means for securing the housing to a support.

LIST OF REFERENCE NUMERALS 1 housing
2 base
3 side wall
4 interior of the housing
inner lens
6 outer lens
7 LED
8 circuit board
9 socket
securing means
11 opening in the housing
12 diaphragm
13 grating
14 structure of the outer lens

What is claimed is:

1. A system for illuminating a surface, the system comprising:
   an elongated lighting means comprising a light source each predetermined length of the elongated lighting means;
   an elongated housing comprising a base and a set of sidewalls affixed to the base and forming an opening opposite the base, wherein the elongated lighting means is affixed to the base on a side of the base facing the opening; and
   at least one elongated lens disposed within the elongated housing, wherein the at least one elongated lens is supplied with light rays from the elongated lighting means, and the at least one elongated lens is connected to the elongated housing such that the at least one elongated lens is replaceable for another elongated lens.

2. The system according to claim 1, wherein the elongated lens is slidably connected to the opening of the elongated housing such that a first end of the elongated lens is inserted into a first end of the opening and the elongated lens is inserted until a second end of the elongated lens is inserted into the first end of the opening.

3. The system according to claim 1, wherein the elongated lens, when supplied with light rays from the elongated lighting means, forms a first optical light effect, and the other elongated lens, when supplied with light rays from the elongated lighting means, forms a second optical light effect different from the first optical light effect.

4. The system according to claim 3, wherein the optical light effects are a dynamic or static illumination of the surface.

5. The system according to claim 4, wherein the optical light effects are an indirect illumination of the surface.

6. The system according to claim 1, wherein one of the at least one elongated lens is an inner lens positioned in an area of a base of the elongated housing and covering each light source of the elongated lighting means.

7. The system according to claim 6, wherein the inner lens has a first surface and a second surface opposite the first surface, and wherein any one or more of the first surface or the second surface has at least one geometric structure protruding therefrom and manipulating at least some of the light rays passing through the inner lens.

8. The system according to claim 1, wherein one of the at least one elongated lens is an outer lens slidably connected to the opening of the elongated housing.

9. The system according to claim 8, wherein the outer lens has a first surface and a second surface opposite the first surface, and wherein any one or more of the first surface or second surface has at least one geometric structure protruding therefrom and manipulating at least some of the light rays passing through the outer lens.

10. The system according to claim 8, further comprising a diaphragm arranged on an exterior surface of the outer lens, the diaphragm having a perforated pattern.

11. The system according to claim 1, further comprising a diaphragm arranged within the elongated housing, the diaphragm having a perforated pattern.

12. The system according to claim 1, wherein at least one of a surface of the base, a surface of at least one side wall of the elongated housing, each facing an interior of the elongated housing, is provided with one of a light-absorbing layer or a light-reflecting layer.

13. The system according to claim 1, wherein the elongated housing comprises at least one means for securing the elongated housing to a support.

14. The system according to claim 1, wherein the light sources are LED.

15. The system according to claim 1, wherein a grating is disposed within an interior of the elongated housing.

* * * * *